United States Patent
Zucker

[11] Patent Number: 5,931,971
[45] Date of Patent: Aug. 3, 1999

[54] METHOD FOR REMOVAL OF HYDROCARBONS FROM FABRICS

[75] Inventor: Jerry Zucker, Charleston, S.C.

[73] Assignee: Thantex Holdings, Inc., North Charleston, S.C.

[21] Appl. No.: 09/158,318

[22] Filed: Sep. 22, 1998

[51] Int. Cl.⁶ ....................................................... D06B 1/00
[52] U.S. Cl. ................................... 8/137; 8/147; 134/40; 134/42
[58] Field of Search .......................... 8/137, 147; 134/40, 134/42

[56] References Cited

U.S. PATENT DOCUMENTS

| | | | |
|---|---|---|---|
| 5,112,358 | 5/1992 | Deal, III | 8/137 |
| 5,207,837 | 5/1993 | Honeycutt | 134/42 |
| 5,207,922 | 5/1993 | McFarlan | 210/708 |
| 5,222,267 | 6/1993 | Fierro | 8/158 |
| 5,707,731 | 1/1998 | Honeycutt et al. | 428/357 |
| 5,762,716 | 6/1998 | Lockhard et al. | 134/2 |

FOREIGN PATENT DOCUMENTS 2171293  8/1986  United Kingdom.

*Primary Examiner*—Alan Diamond

[57] ABSTRACT

A method or removing and disposing hydrocarbons absorbed in a fabric, the method comprising the steps of providing a nonwoven fabric which comprises in excess of 55% fibers of polyvinyl alcohol, and wherein the nonwoven fabric is contaminated with hydrocarbons, disposing the nonwoven fabric in a warm aqueous bath heated to a temperature substantially less than the dissolution temperature of the polyvinyl alcohol fibers, whereby to cause liberation of the hydrocarbons from the fabric.

5 Claims, No Drawings

METHOD FOR REMOVAL OF HYDROCARBONS FROM FABRICS

BACKGROUND OF THE INVENTION

This invention relates to a method of separating hydrocarbons and other organic materials from fabrics such as shop rags.

Conventional shop rags are typically made of woven cotton fabrics as well as nonowoven fabrics, and these rags are used in the industry to wipe up oil, grease and solvents, or to clean parts with hydrocarbons and other solvents. These reusable rags are then laundered, using sufficient detergent and high temperature and agitation to emulsify hydrocarbons.

There is increasing governmental regulation in the field of cleaning of soiled rags and garments, and there is a limitation on the amount of hydrocarbons which may be discharged to a sewer.

In order to deal with these problems, special cleaning procedures have been developed, usually involving extraction of the soiled item with a volative organic solvent. Such methods require recovery of the solvent and subsequent evaporation to separate the hydrocarbons and are not entirely satisfactory. Examples of various proposals may be found in U.S. Pat. Nos. 5,222,267, 5,207,922, and 5,112,358.

An example of a disposable fabric may be found in U.S. Pat. No. 5,207,837. Here, the fabric is made from fibers of polyvinyl alcohol. After use, the fabric is placed in a hot water bath and heated to a temperature above 37° C. to dissolve the fabric in the water, whereupon the water is passed into a sewer.

SUMMARY OF THE INVENTION

In accordance with the present invention a rag or other article subject to contamination by hydrocarbons is made from a fabric comprising a majority of fibers of polyvinyl alcohol (PVA). The PVA fiber employed has a dissolution temperature in water of about 180° to 210° F.

The rags or other articles are employed in the normal manner, and it has been found that PVA fibers have a strong affinity for absorbing oil.

After the fabric has become soiled it is placed in a bath of warm water in the order of 80° to 130° F. and substantially below the dissolution temperature of the PVA. The fabric may be mildly agitated. The water bath is generally free of any detergents or emulsifying agents.

It has been found that fabrics comprising PVA fibers will release hydrocarbons more easily than other fabrics. As a result, hydrocarbons are released from the fabric and rise to the top of the bath, since most have a density of less than the water in the bath. Thus, the hydrocarbons can be easily removed from the bath by draining or skimming, especially since they are not in emulsified form.

Following the hydrocarbon separation step, the articles may be subjected to additional cleaning and returned to service.

DETAILED DESCRIPTION

A fabric is prepared using conventional techniques. The fabric may be woven or knitted using conventional methods. In order to reduce costs, however, the fabric is preferably a nonwoven. Especially suitable are nonwovens made from staple fibers. The fibers are carded into a web of suitable thickness and fiber orientation, and the web is consolidated using a variety of methods. Suitable methods are thermal point bonding and adhesive bonding. One preferred method is hydroentanglement, in which the unconsolidated web is conveyed over a porous conveyor and is treated with fine jets of water, causing the fibers to become tangled in a pattern. The basic process is described in U.S. Pat. No. 3,485,706, incorporated herein by reference.

The fabric comprises in excess of 55 percent PVA fibers and preferably in excess of 90 percent PVA. Preferably, the polyvinyl alcohol fibers are highly crystallized by post drawing or annealing. These fibers are available commercially. Fiber denier is not critical, and a mixture of deniers can be used. If other fibers are present, they can be in the form of any natural or synthetic fiber available, but preferably the fibers are somewhat resistant to hydrocarbons. While the basis weight of the fabric is not critical to the functional aspects, it is expected that in most application, such as use in rags, shop towels, mop heads, aprons and the like, the basis weight will exceed 50 grams per square meter (gsm). Preferably, the PVA fiber is substantially insoluble in aqueous baths until heated to 180° F. and higher.

The resulting fabric is cut into individual sheets and may be dry packaged for use in a dry form, or the sheets may be pretreated with a solvent. The articles are then employed in the normal fashion, and articles contaminated with hydrocarbons are collected for recycling.

Surprisingly, it has been found that PVA fabrics have the ability to strongly absorb hydrocarbons in a dry state at room temperature and the ability to strongly repel hydrocarbons when warmed in an aqueous bath, allowing recovery in excess of 90 percent of the hydrocarbons.

As employed herein, the term "hydrocarbon" is used in the general sense to solids, liquids and volatile materials, which are organic in nature, as well as substances which may be dissolved in these organic materials. Also, this term is generally used to refer to organic materials and solvents which may encounter rags of this nature and which are insoluble in water.

The soiled rags are placed in an aqueous bath and heated to a temperature of about 80° to 130° F. Although somewhat higher temperatures can be used, the PVA cloth tends to start dissolving, and in any event, no gain in separation efficiency is realized. The articles may be mildly agitated in the bath to speed up the separation. Preferably, no detergents, surfactants or emulsifying agents are used in the bath, since the primary objective is to remove the hydrocarbons from the water to allow for safe disposal.

As the hydrocarbons become separated in the bath, they will generally rise to and float on the surface, allowing for easy removal. For example, the hydrocarbon layer may be simply skimmed or drained, or the layer may be brought into contact with a material capable of selectively absorbing hydrocarbons, such as granules of thermoplastic rubber.

Following the separation step, the fabric may be additionally washed and reused. Another alternative is to recycle the polymer in the fabric, or simply dispose of the fabric.

EXAMPLE

A fabric having a basis weight of 80 gsm was prepared from 100% PVA fibers. The fabric was made from carded and cross lapped fiber layers to achieve high strength in two directions. The fabric was cut into 8×8 sheets, pre-weighed, and soaked in 10W40 motor oil for 60 seconds. The samples were again weighed to determine the weight of oil absorbed.

The samples were immersed in a water bath at temperatures of 80, 100, 125 and 155° F. and agitated. At a temperature of 125° F. minor shrinkage of the fabric was noted, and substantial shrinkage was noted at 155°. In all cases, in excess of 93% of the absorbed oil was removed by virtue of immersion in warm water. The fabrics maintain excellent machine direction and cross machine direction strength when compared to conventional nonwoven wiping cloths of the same basis weight.

I claim:

1. Method of removing and disposing of hydrocarbons absorbed in a fabric, said method comprising the steps of providing a nonwoven fabric which comprises in excess of 55% fibers of polyvinyl alcohol, and wherein the nonwoven fabric is contaminated with hydrocarbons, disposing the nonwoven fabric in a warm aqueous bath heated to a temperature substantially less than the dissolution temperature of the polyvinyl alcohol fibers, whereby to cause liberation of the hydrocarbons from the fabric.

2. The method of claim 1 wherein the aqueous bath is free from detergent.

3. The method of claim 1 wherein the aqueous bath is heated to a temperature of 80 to 130° F.

4. The method of claim 4 wherein the nonwoven fabric is a hydroentangled fabric.

5. Method of cleaning fabrics soiled with hydrocarbons comprising the steps of providing a nonwoven fabric made from at least 55% of polyvinyl alcohol fibers, said fibers being soluble in an aqueous bath when heated to a first temperature, and after the nonwoven fabric has been soiled by hydrocarbons, immersing the soiled fabric into an aqueous bath heated to a second temperature substantially below the first temperature, whereby to separate the hydrocarbons from the fabric without emulsification.

* * * * *